United States Patent
Bacon, Jr.

(10) Patent No.: US 6,660,390 B2
(45) Date of Patent: Dec. 9, 2003

(54) PRINTABLE FILM AND COATING COMPOSITION EXHIBITING STAIN RESISTANCE

(76) Inventor: Chester A. Bacon, Jr., P.O. Box 33427, St. Paul, MN (US) 55133-3427

( * ) Notice: Subject to any disclaimer, the term of this patent is extended or adjusted under 35 U.S.C. 154(b) by 0 days.

(21) Appl. No.: 10/076,662

(22) Filed: Feb. 15, 2002

(65) Prior Publication Data

US 2002/0164460 A1 Nov. 7, 2002

Related U.S. Application Data

(63) Continuation-in-part of application No. 09/899,686, filed on Jul. 5, 2001.
(60) Provisional application No. 60/272,912, filed on Mar. 2, 2001.

(51) Int. Cl.[7] .......................... B32B 27/00; B32B 27/40
(52) U.S. Cl. ............................. 428/423.1; 428/423.3; 428/425.6
(58) Field of Search ......................... 428/423.1, 423.3, 428/425.6; 525/100, 101, 123, 125, 126

(56) References Cited

U.S. PATENT DOCUMENTS

| | | | |
|---|---|---|---|
| 4,129,611 A | * 12/1978 | Heiss ......................... 525/440 |
| 4,664,966 A | 5/1987 | Bailey et al. |
| 4,767,659 A | 8/1988 | Bailey et al. |
| 4,808,471 A | 2/1989 | Grunzinger |
| 5,082,737 A | 1/1992 | Bobrich et al. |
| 5,117,304 A | 5/1992 | Huang et al. |
| 5,278,275 A | 1/1994 | Yatsuka et al. |
| 5,424,355 A | 6/1995 | Uemae et al. |
| 5,441,771 A | * 8/1995 | Seltmann et al. ............ 427/386 |
| 5,514,441 A | 5/1996 | Pohto et al. |
| 5,610,215 A | 3/1997 | Nonweiler et al. |
| 5,614,575 A | * 3/1997 | Kotschwar ................... 524/270 |
| 5,976,669 A | * 11/1999 | Fleming ...................... 428/143 |
| 6,025,068 A | 2/2000 | Pekala |
| 6,054,208 A | 4/2000 | Rega et al. |
| 6,130,308 A | 10/2000 | Rink et al. |
| 6,191,200 B1 | 2/2001 | Phillips |
| 6,312,858 B1 | * 11/2001 | Yacobucci et al. ............. 430/17 |
| 6,323,266 B2 | 11/2001 | Phillips |

FOREIGN PATENT DOCUMENTS

| | | |
|---|---|---|
| EP | 1 022 128 | 7/2000 |
| FR | 2 681 072 | 3/1993 |
| JP | 10044587 | 2/1998 |
| WO | WO 02/31016 | 4/2002 |
| WO | WO 02/062894 | 8/2002 |

OTHER PUBLICATIONS

Morton Thermoplastic Polyurethanes; Morthane® Polyurethane Polymers For Magnetic Recording Media (Oct. 1998).

* cited by examiner

Primary Examiner—James J. Seidieck
Assistant Examiner—Travis B. Ribar
(74) Attorney, Agent, or Firm—Carolyn A. Fischer

(57) ABSTRACT

The present invention relates to articles having a printed surface as well as flexible coating and film compositions that are printable in combination with exhibiting stain resistance. The composition comprises a hard component having an elongation of less than about 150%, a soft component having an elongation of greater than about 200%, and a cross-linking agent. The hard component preferably comprises a thermoplastic polyurethane, acrylic polymer, polymeric polyol or mixture thereof. The soft component preferably comprises a thermoplastic urethane, polymeric polyol, or mixture thereof; whereas the cross-linking agent is preferably an isocyanate.

21 Claims, No Drawings

PRINTABLE FILM AND COATING COMPOSITION EXHIBITING STAIN RESISTANCE

RELATED APPLICATIONS

This application is a continuation-in-part of U.S. patent application Ser. No. 09/899686, filed Jul. 5, 2001 that claims priority from U.S. provisional application serial No. 60/272,912, filed Mar. 2, 2001.

FIELD OF THE INVENTION

The present invention relates to articles having a printed surface as well as flexible coating and film compositions that are printable in combination with exhibiting stain resistance. The composition comprises a hard component having an elongation of less than about 150%, a soft component having an elongation of greater than about 200%, and preferably a cross-linking agent. The hard component preferably comprises a hydroxy functional thermoplastic polyurethane, hydroxy functional acrylic polymer, polymeric polyol or mixture thereof. The soft component preferably comprises a hydroxy functional thermoplastic urethane, non-reactive urethane, polymeric polyol, or mixture thereof; whereas the cross-linking agent is preferably an isocyanate.

BACKGROUND OF THE INVENTION

During the manufacture of various retroreflective articles such as signs and personal protection apparel, a surface of a retroreflective sheeting construction is often coated with an ink receptive coating that can be printed upon with ink. A water-borne urethane, commercially available from ICI Resins (or Zeneca Resins) Wilmington, Mass. under the trade designation "Neorez R-960" that has been combined with an aziridine cross-linker, also commercially available from ICI Resins, under the trade designation "CX-100" is a representative ink-receptive coating. This ink receptive coating is not stain resistance when contacted with highly plasticized polyvinyl chloride comprising fluorescent yellow dye.

In general, to enhance the durability and stain resistance of printed articles and articles, a protective cover film or top coat is often applied over the ink graphic. In order to contribute the desired properties, the protective cover film or top coat typically comprises a highly cross-linked polymer. An exemplary top coat is a polyurethane composition that is the reaction product of a hydroxy functional acrylic polymer, a polyester polyol, an aliphatic polyisocyanate, and a catalyst. This top coat, although flexible and stain resistant, is not print receptive.

Industry would find advantage in flexible compositions that are suitable for films and coatings that are printable and stain resistant, eliminating the need for an ink receptive coating in combination with a protective top coat or cover film.

SUMMARY OF THE INVENTION

The present invention relates to a composition that exhibits a synergistic combination of flexibility, printability, and stain resistance. The composition is suitable for use as a coating on a substrate or as a free-standing film, ranging in thickness from about 5 microns to about 125 microns. In preferred embodiments the composition exhibits good surface slip and/or is transparent.

In one embodiment, the present invention is an article comprising a layer, such as a coating or a film, the layer comprising the reaction product of a hard component having an elongation up to about 150%; a soft component having an elongation ranging from about 200% to about 800% after cross-linking; and a cross-linking agent. The layer may further comprise an ink on said layer. The Shore Hardness of the hard component is preferably at least about 40 D and more preferably at least about 70 D. The hard component has functionality and preferably comprises a first polyurethane polymer, an acrylic polymer, polymeric polyol or mixture thereof. The soft component has functionality and preferably comprises a second polyurethane polymer, a polymeric polyol, or mixture thereof. The polymeric polyol of both the soft and hard component is preferably a polyester polyol.

In another embodiment, the present invention is an article comprising a layer, such as a coating or film, comprising a composition comprising at least one first polymer having an elongation up to about 150% and at least one second polymer having an elongation ranging from about 200% to about 600%. The layer may further comprise an ink on said layer. The first polymer preferably comprises a first polyurethane polymer, an acrylic polymer, or mixture thereof. The second polymer comprises a second polyurethane polymer. The composition is substantially free of a cross-linking agent and is thus unreactive.

In another embodiment, the present invention relates to an article comprising a printable polymeric layer; wherein said polymeric layer is soluble in at least one solvent comprising acetone, methyl ethyl ketone, methyl isobutyl ketone, cyclohexanone, propylene glycol methyl ether acetate, ethyl acetate, propylene glycol methyl ether and mixtures thereof; and wherein said polymeric layer is flexible and stain resistant. The printable polymeric layer is insoluble in at least one solvent comprising ethanol, isopropanol, toluene, xylene, kerosene, gasoline, and mineral spirits.

Particularly for 100% solids systems, the hard component and soft component are preferably thermoplastic. Further, the previously described articles may further comprise a substrate. The article may also further comprise at least one bonding layer. The bonding layer is typically disposed between the printed layer and the substrate. In other embodiments, the previously described articles may further comprise a colorant in the substrate, inventive coating, bonding layer, and/or as a separate color layer.

The film and coating composition of the invention is suitable for use on a variety of articles and in particular as a surface layer on retroreflective sheeting.

In another embodiment, the present invention is a composition comprising a hard component comprising a first thermoplastic polyurethane polymer, an acrylic polymer, polymeric polyol, or mixture thereof; the hard component having functionality and an elongation up to about 150%; a soft component comprising a second thermoplastic polyurethane polymer, optionally having functionality and an elongation ranging from about 200% to about 600% after cross-linking, wherein the ratio of the hard component to soft component ranges from about 2:3 to 1:9; and at least one isocyanate. The Shore D Hardness of the hard component is at least about 40 and preferably at least about 70. The weight ratio of the hard component to the soft component ranges from about 1:2 to 1:6. The hard component preferably has an elongation of less than 50%. The soft component preferably has an elongation of greater than about 300%. The hard component is preferably a polyester polyol, ranging in number average molecular from 1000 to 10,000 g/mole. The composition may further comprise a monofunctional slip additive such as a hydroxy functional silicone.

DETAILED DESCRIPTION OF THE INVENTION

"Article" refers to a free-standing film or a laminate comprising a coated substrate.

"Hard component" refers to a polymer having an elongation of less than about 150%, and preferably an elongation of less than about 100% according to ASTM D-412.

"Soft component" refers to a polymer having an elongation of greater than about 200%, and preferably an elongation of greater than about 300% according to ASTM D-412. Further, the elongation of the soft component is typically less than about 800%. In the case of reactive compositions, the soft component may be a non-film forming liquid and thus exhibits the target elongation after cross-linking. In such instances, the elongation of the soft component can be determined by combining appropriate amounts of cross-linker and soft component, curing the soft component, and measuring the elongation of the cured soft component according to ASTM D-412.

"Polymer" and "polymeric" refers to a material comprising 10 or more repeating units. Polymers typically have a number average molecular weight (Mn) of at least 1000 g/mole in the case of polymeric polyols (e.g. polyester polyols, acrylic polyols) and at least 5000 to 6000 g/mole in the case of thermoplastic polyurethanes and acrylic polymers.

In addition to the elongation, the hard component, as well as the mixture of hard and soft components, preferably can be characterized by a hardness that can be measured and reported with reference to the Shore D Hardness scale. The Shore D Hardness is preferably at least about 30, more preferably at least about 50, and most preferably greater than about 70.

"Thermoplastic" refers to a material that may be softened by heat and cooled in a reversible physical process.

"Polyurethane" refers to a polymer produced by the reaction of a polyisocyanate and compound comprising polyfunctional hydroxyl groups.

"Ink" refers to a suspension of finely divided colorant (e.g. pigment and/or dye) in a solution or polymeric binder.

"Soluble" refers to surface marring of a substrate (e.g. PVC) coated with the inventive barrier composition at a thickness of 1 mil (25 microns) after rubbing the coated surface with swabs saturated with the indicated solvent for 60 seconds.

"Insoluble" refers to lack of such surface marring.

"Stain resistant" and "stain resistance" refers to the physical property wherein a article prepared according to the test method described in the examples exhibits an xy shift of less than 0.05 at 75° F. (24° C.) after 48 hours at a pressure of 200 psi (14 bar). Preferred compositions exhibit an xy shift of less than 0.03. More preferred compositions exhibit stain resistance at elevated temperature ranging up to about 40° C., with most preferred compositions exhibiting stain resistance at 60° C.

"Printable" and "ink receptive" refers to the physical property wherein a article prepared according to the test method described in the examples passes the ink adhesion test with "3M Scotchcal Screen Printing Ink Series 4400" (black 4400-05). "Pass" refers to less than 50% of the ink being present on the tape such that an ink graphic would be readable. Preferably, less than 10% of the ink is present on the tape and more preferably the tape is substantially free of ink.

"Enhanced Surface Slip" refers to the physical property wherein the coated surface of the article, prepared according to the test method described in the examples, will slide apart easily when overlapped onto itself by 4 inches (10 cm) with a four-pound (1800 g) weight on the overlap.

"Flexible" refers to the physical property wherein a cured coating or film having a thickness of 50 microns can be creased at 25° C. without any visible cracks. Preferred compositions are sufficiently flexible such that a cured coating or film having a thickness of 125 microns and more preferably 250 microns can be creased at 25° C. without any visible cracks. More preferred compositions also pass more severe flexibility tests, including any one or combination of the following:
 1. ISO 4675 at −20° C.
 2. ISO 7854 exhibiting only slight (Type 1) surface cracks (Type A) after 7500 cycles.
 3. ISO 6330 exhibiting no breaks and greater than 50% transmission with 50 wash cycles at 60° C. and dried at 50° C.

In preferred embodiments, the composition of the present invention is a reaction product of a hard component, a soft component and a cross-linking agent. Although cross-linking is preferred, unreactive polymers may alternatively be employed, provided the cured composition exhibits the desired flexibility, printability, and stain resistance. Accordingly, the composition of the present invention alternatively comprises an unreacted mixture of a hard component and a soft component. Further, the composition may comprise a cross-linked hard component admixed with an unreacted soft component.

The hard component typically has a number average molecular weight (Mn), ranging from about 5000 to 100,000 g/mole, and preferably ranging from about 10,000 to 50,000 g/mole, particularly in the case of thermoplastic polyurethanes and acrylic polymers. In the case of an unreacted mixture, the soft component is also preferably polymeric, also having a molecular weight in this range. However, the molecular weight of the hard and soft component for reactive compositions can be lower, such as in the case of polymeric polyols. The molecular weight of polymeric polyols for use in the invention typically ranges from about 1000 to 20,000 g/mole. Preferably, the molecular weight is less than about 10,000 g/mole and more preferably less than about 5,000 g/mole.

Accordingly, a variety of combinations of hard component(s) and soft component(s) may be employed. Combinations the present inventor has found to be of particular utility include:
 a) a blend of thermoplastic polyurethane and hydroxy functional acrylic polymer as the hard component in combination with a thermoplastic polyurethane soft component;
 b) a blend of hydroxy functional acrylic polymer and a moisture curing polyurethane as the hard component with a thermoplastic polyurethane as the soft component;
 c) hydroxy functional acrylic polymer as the sole hard component in combination with a thermoplastic polyurethane soft component;
 d) a polyester polyol as the hard component in combination with a thermoplastic polyurethane soft component, optionally further comprising additional soft components such as a polyester polyol and/or a second thermoplastic polyurethane;
 e) a blend of thermoplastic polyurethane and polymeric polyol as the soft component in combination with a hydroxy functional acrylic polymer as the hard component;
 f) a blend of a thermoplastic polyurethane and polymeric polyol as the soft component in combination with a blend of a hydroxy functional acrylic polymer with a thermoplastic polyurethane as the hard component;

g) a moisture curing polyurethane as the hard component with a thermoplastic polyurethane as the soft component; and h) both the hard and soft components being thermoplastic polyurethanes.

In preferred embodiments, the hard component and/or the soft component preferably comprise functional end groups or functional side chains such that the components can be reacted to form a cross-linked network. Hard components and soft components comprising functional end groups are surmised to be preferred. Although monofunctional components may be employed, preferably the hard component, soft component, and cross-linking agent comprise at least two functional groups. Hence, the hard component, soft component and cross-linking agent are difunctional or polyfunctional with difunctional components typically being preferred for the soft component and polyfunctional being preferred for the hard component. Further, and in particular for 100% solids systems, it is preferred that the mixture of hard component(s), soft component(s), and optional cross-linking agent(s) are thermoplastic prior to reaction extrusion. For enhanced weatherability, it is preferred that all the components of the coating are substantially aliphatic.

The hard component preferably comprises at least one hydroxy functional thermoplastic polyurethane, acrylic polymer, polymeric polyol or mixture thereof. The soft component preferably comprises at least one hydroxy functional thermoplastic polyurethane, non-reactive polyurethane, polymeric polyol, or mixture thereof. The optional cross-linking agent preferably comprises at least one isocyanate having at least two —NCO groups. Alternatively, a —NCO terminated soft component(s) and —NCO terminated hard component(s) may be employed in combination with a diol cross-linking agent(s). In the case of unreactive systems, however, neither the soft component nor the hard component is a polymeric polyol or the composition is substantially free of cross-linking agent A preferred composition is the reaction product of one or more hard components, wherein the sum concentration of hard component(s) is at least about 10 percent by weight, and preferably at least about 20 percent by weight. Unless specified otherwise, percent by weight refers to the percent solids—after evaporation of any solvent. The sum concentration of the hard component(s) is typically present in amounts of less than about 45 percent by weight, preferably less than about 40 percent by weight, and more preferably less than about 30 percent by weight. In addition to the hard component(s), the composition comprises one or more soft components, wherein the sum concentration of soft component(s) ranges from about 45 to about 80 percent by weight. Further, the cross-linking agent(s) is typically present in an amount ranging from about 5 percent by weight to about 35 percent by weight. Preferably, the concentration of cross-linking agent ranges from about 10 percent by weight to about 25 percent by weight. At concentrations greater that 35 percent by weight isocyanate cross-linker, the composition tends to become unprintable.

For embodiments wherein unreactive hard and soft components are alternatively employed, the concentration of the hard component(s) and soft component(s) is nearly the same as just described with the exception that the sum of the hard component(s) is typically at least about 15 percent by weight and the maximum amount of soft component is typically about 85 percent by weight. One of ordinary skill in the art recognizes that the lack of cross-linker (e.g. polyisocyanate) renders the composition unreacted.

Polyurethanes may be synthesized from known techniques, by reacting one of more polyols with one or more isocyanates. Representative polyols include, for example, polyether polyols, polyester polyols, acrylic polyols, polyester amides, polycaprolactone polyols, etc. Polyether polyols, such as various polyoxyalkylene glycols, are prepared by the polymerization of alkylene oxides with suitable initiators having active hydrogens in their structure. Polyester polyols are generally prepared by reacting one or more dicarboxylic acids, also referred to as dimer acids, with one or more diols or triols. Common acids include adipic acid, glutaric acid, sebacic acid, suberic acid, azelaic acid, succinic acid, cyclohexane dicarboxylic acid, phthalic acid, as well as their corresponding anhydrides. Glycols typically employed in the preparation of polyester polyols generally include ethylene glycol; 1,2-propylene glycol; 1,3-propanediol, 2-methyl-1,3-propanediol; 1,3-butanediol; 1,4-butylane diol; 1,6-hexanediol; diethylene glycol and neopentyl glycol. Polyisocyanates employed in the preparation of polyurethanes include diphenylmethane-4,4'-diisocyanate (MDI); toluene diisocyanate (TDI); 1,4-tetramethylene diisocyanate, 1,6-hexamethylene diisocyanate (HDI); 1,12-dodecane diisocyanate; cyclobutane-1,3-diisocyanate; 1-isocyanato-3,3,5-trimethyl-5-isocyanatomethylcyclohexan; bis(4-isocyanatocyclohexyl) methane; isophorone diisocyanate (IPDI); bis(4-isocyanatocyclohexyl)methane; 4,4'-methylenedicyclohexyl diisocyanate; 1,6-diisocyanato-2,2,4,4-tetramethylhexane; 1,6-diisocyanato-2,4,4-trimethylhexane; cyclohexane-1,4-diisocyanate; as well as others.

For embodiments wherein a polymeric polyol is employed as the hard and/or soft component, the polymeric polyol is preferably a polyester polyol. A representative saturated polyester polyol suitable for use as the hard component is commercially available from Bayer Corporation, Pittsburg, Pa. under the trade designation "Desmophen 651 A-65". Polymeric polyols suitable for use as the soft component are also available from Bayer Corporation under the trade designations "Desmophen 670A-80" and "Desmophen R221-75".

Alternatively, hard and soft component hydroxy functional thermoplastic polyurethanes are commercially available from various suppliers. Physical properties, as reported by the supplier, of representative hydroxy functional thermoplastic polyurethanes suitable for use in the invention are reported in Tables I to III as follows:

TABLE I

Estane ® Thermoplastic Polyurethanes

| Product Number | Polyol Type | Specific Gravity ASTM D-792 | Shore Hardness ASTM D2240 | Stress @ 100% ASTM D-638 (psi/MPa) | Tensile @ break ASTM D-638 (psi/MPa) | Strain @ break ASTM D-638 | Tg-Glass transition DSC/2nd heat (° F./° C.) |
|---|---|---|---|---|---|---|---|
| 5707 | Ester | 1.22 | 45 D | 1400/9.7 | 7300/50.3 | 380 | 27/−3 |
| 5715 | Ester | 1.21 | 54 D | 1450/10.0 | 6700/46.2 | 350 | 79/26 |

TABLE I-continued

Estane ® Thermoplastic Polyurethanes

| Product Number | Polyol Type | Specific Gravity ASTM D-792 | Shore Hardness ASTM D2240 | Stress @ 100% ASTM D-638 (psi/MPa) | Tensile @ break ASTM D-638 (psi/MPa) | Strain @ break ASTM D-638 | Tg-Glass transition DSC/2nd heat (° F./° C.) |
|---|---|---|---|---|---|---|---|
| 5706 | Ester | 1.20 | 83 D | 6400/44.1 | 7000/48.3 | 105 | 153/67 |
| 5778 | Ester | 1.21 | 78 D | 2600/17.9 | 5000/34.5 | 250 | 88/31 |
| 5799 | Ester | 1.22 | 86 D | — | 7600/52.4 | 10 | 153/67 |

Commercially available from B.F. Goodrich, Cleveland, OH.

TABLE II

Morthane ® Polyurethane Polymers

| Product Number | 100% Modulus psi (kg/cm²) | Yield Stress psi (kg/cm²) | Tensile at Break Psi (kg/cm²) | Elongation at Break (%) | Glass Transition (Tg) ° C. | Flow Point (° C.) | Hardness (Shore A/D) |
|---|---|---|---|---|---|---|---|
| CA-118 | 5750 (404) | 7250 (510) | 9700 (682) | 255 | 58 | 114 | 75 D |
| CA-139 | 3900 (274) | 6000 (422) | 8200 (576) | 290 | 43 | 102 | 74 D |
| CA-237 | 1240 (87) | — | 8500 (598) | 400 | 26 | 94 | 72 D |
| CA-239 | 3800 (267) | 5800 (408) | 7500 (527) | 235 | 42 | 110 | 79 D |
| CA-271 | 6100 (429) | 7200 (506) | 8000 (563) | 225 | 53 | 130 | 77 D |
| CA-328 | 2455 (173) | 2650 (186) | 7420 (522) | 340 | 34 | 90 | 70 D |
| CA-371 | 6100 (429) | 7500 (527) | 8200 (576) | 225 | 56 | 130 | 77 D |
| CA-965 | 1600 (112) | — | 7400 (520) | 480 | −10 | 163 | 40 D |
| CA-133 | 380 (27) | — | 8300 (584) | 485 | 22 | 90 | 64 D |
| CA-2300 | 2800 (183) | 2600 (183) | 7200 (506) | 260 | 35 | 85 | 79 D |
| CA-2237 | 500 (35) | 4000 (281) | 7000 (492) | 450 | 19 | 90 | 72 D |
| CA-2239 | 1500 (105) | 1400 (98) | 6800 (478) | 300 | 26 | 80 | 72 D |
| CA-151HT | N.A. | 6800 (478) | 6000 (422) | 35 | 77 | 106 | 82 D |
| CA-152 | 4300 (302) | 6600 (464) | 7200 (506) | 280 | 47 | 100 | 82 D |

Commercially available from Huntsman Polyurethanes, Ringwood, IL

TABLE III

"MC 75" Polyurethane Polymer

| | | ASTM Test Method |
|---|---|---|
| Technical Information | | |
| % Solids | 40 ± 1 | D-2369 |
| Viscosity (@ 25° C.) | 60–125 cps | D-2196 |
| % NCO | 2.5–3.1 | |
| Weight/Gallon | 8.01 lb ± 0.10 | D-1475 |
| Typical Physical Properties | | |
| Elongation | 85% | D-412 (Instron tester at 2"/min.) |
| Hardness (Sward) | 38 | D-2134 |
| Tensile Strength | 5000 psi | D-412 (Instron tester at 2"/min.) |

Acrylic polymers suitable for use as the hard component include acrylic resins prepared from various (meth)acrylate monomers such as polymethylmethacrylate (PMMA), methyl methacrylate (MMA), ethyl acrylate (EA) etc. alone or in combination with each other. Acrylic polymers for use in the invention can be synthesized and are commercially available, for example, from Rohm and Haas Company, Philadelphia, Pa. under the trade designation "Paraloid AU608S", "Paraloid AU1164" and "Acryloid A-11"; from the Cognis division of Henkel, Ambler, Pa. under the trade designation "G-Cure 867PX60" and from Ineos Acrylics, Cordova, Tenn. under the trade designation "Elvacite 2021" and "Elvacite 2041".

In general, the commercially available hydroxy functional acrylic polymer species tend to be harder (lower elongation and/or about equal to higher Shore D Hardness) than the commercially available hard component thermoplastic polyurethanes. For embodiments wherein the hydroxy functional acrylic polymer is the sole hard component, the weight ratio of the hydroxy functional acrylic polymer to the soft component ranges from about 1:3 to 1:9. The hydroxy functional acrylic polymers are typically employed at concentrations of less than about 30% by weight and preferably at concentration ranging from about 15% to about 10% by weight. The hydroxy functional acrylic polymer may be employed in combination with a hard polyurethane, to boost the overall strength of the composition. In such embodiments, the weight ratio of hydroxy functional acrylic polymer(s) to hard component polyurethane(s) ranges from about 3:1 to about 1:3.

By adjusting the ratio of hard component(s) to soft component(s), varying the concentration of the optional acrylic polymer, and/or changing the concentration of cross-linker, the flexibility of the composition can be adjusted. Hence, the preferred elongation, Shore Hardness, and concentration of each of the components are dependent upon the targeted final properties. In general, the lower elongation and/or higher Shore D Hardness hard component polymers may be employed at lower concentrations in comparison to hard component polymers having a higher elongation and/or lower Shore D Hardness.

The weight ratio of hard component to soft component typically ranges from about 2:3 to about 1:9, and preferably ranges from 1:2 to 1:6. Hence, the hard component tends to be present at about equal to lower concentrations with respect to the soft component. For a coating composition that is highly flexible such that the coating doesn't crack when creased, preferred compositions comprise a minor amount of hard component in combination with a major amount of soft component. For example, in instances wherein a soft component having an elongation of about 400% and a Shore D Hardness of about 70 is employed in combination with a hard component having an elongation of about 35% and a Shore D Hardness of about 80, the weight ratio of hard component to soft component preferably ranges from about 1:3 to about 1:5. Similar flexibility and stain resistance can be obtained by employing a soft component having an elongation of about 350% and a Shore D Hardness of about 54 in combination with a hard component having an elongation of about 85% and a Sward Hardness (ASTM D-2134) of about 40. However, in this instance the weight ratio of hard component to soft component preferably ranges from about 1:5 to about 1:7.

The hard component and soft component are preferably combined and reacted with at least one cross-linking agent. For embodiments wherein the hard and soft components are hydroxy functional, the cross-linking agent is typically a diisocyanate or polyisocyanate. In the case of solvent systems, excess isocyanate is generally not advantageous as unreacted isocyanate after moisture curing tends to reduce the flexibility. A wide variety of isocyanate cross-linking agents are available such as those previously described.

For further enhancement in surface slip properties or improved release from a liner, the composition preferably comprises a monofunctional slip agent such as hydroxy functional silicone, commercially available from BYK Chemie USA, Wallingford, Conn. under the trade designations "BYK 370".

The composition of the present invention may further comprise one or more of an assortment of additives to impart such properties as coating uniformity, conspicuity, aesthetics, release properties, or outdoor weathering. Commonly employed additives include surfactants, flow control agents, wetting agents, colorants (e.g., pigments and dyes), ultraviolet (UV) stabilizers, hindered amine light stabilizers (HALS), etc. For improved weathering, particularly in instances wherein aromatic components are employed, the composition of the invention as well as the optional bonding layer typically comprises UV stabilizers and/or HALS.

The composition of the present invention can be applied from solvent solution. For embodiments wherein the components are water dispersible, aqueous delivery can also be employed. The percent solids are adjusted such that the composition is suitable for the intended application method. In general, the percent solids ranges from about 20 to about 35 such that the viscosity ranges from about 900 to about 2000 cps (mPa.sec). In comparison to highly cross-linked stain resistant coatings that typically require solvents, many embodiments of the present invention can advantageously be applied molten as 100% solid systems.

In view of such versatility, the composition of the present invention can be applied by a variety of coating methods including direct coating, transfer laminating, and coextrusion methods.

Overall, the thickness of the barrier composition ranges from about 5 microns to about 125 microns. The thickness of the inventive coating typically ranges from about 5 microns to about 10 to 15 microns. For embodiments wherein the coating is provided in the absence of a bonding layer, the preferred thickness is generally higher, ranging from about 10 to 15 microns. Further, preferred embodiments are flexible at higher film thickness ranging from about 50 microns to 125 microns.

The coating composition of the present invention may be applied to a wide variety of substrates. The use of the present invention is particularly well suited for coating or providing a film layer upon highly flexible film substrates such as polyvinyl chloride, copolyester and other polyurethanes. Other materials, such as polyolefins, etc. can also be coated, provided an appropriate bonding layer is provided. Alternatively, the composition of the present invention can be cast or extruded onto a release-coated belt or liner and stripped off, to form a film substrate.

The composition of the invention can be coated or coextruded as one or more layers onto PVC, copolyesters, and other materials to dramatically improve the surface properties without diminishing the flexibility of the substrate being coated. Stain resistance, surface slip, and ink receptiveness can be incorporated into otherwise lower performance materials such as untreated PVC.

At proportionally thinner calipers, of approximately 10% of the substrate thickness, the composition of the invention provides a high performance exterior skin and/or underlying protection layer to lower cost films or substrates, that alone do not exhibit the desired printability and/or stain resistance. The article of the invention provides a significant cost savings in comparison to the same caliper of more expensive materials such as polyurethane film substrates and film substrate comprising fluoropolymers, alone or blended with other materials.

The articles of the invention may further comprise at least one bonding layer disposed on a surface of the inventive barrier layer composition. Although optional for solvent delivery of coatings and for the formation of extruded film substrates, the bonding of 100% solids systems typically prefers a bonding layer to adhere the inventive barrier layer to a substrate. The bonding layer is chosen such that it does not diminish the flexibility, printability and stain resistance of the composition of the invention, yet is sufficiently compatible such the bonding layer improves the adhesion between the barrier layer and the substrate the barrier composition is being applied to. When bonding heat sensitive substrates, such as PVC, the bonding layer preferably has a flow point of at least 100° C., to insure that bonding layer can be heat laminated at temperatures below 300° F. (149° C.) and preferably at about 250° F. (121° C.). Thermoplastic polyurethanes having an elongation of about 200% to 400%, as measured according to ASTM D-412, are preferred bonding layers. Alternatively, however, a pressure sensitive adhesive layer from materials such as acrylics, polyesters, and rubbers can be employed as the bonding layer, particularly in instances wherein the staining or plasticizer migration are more likely to contact the exterior barrier surface rather than the bonding layer.

The bonding layer(s) may further comprise additives, as in the case of the inventive barrier layer composition. Further, the bonding layer and or barrier layer can comprise a colorant (e.g. pigment or dye), such that either layer may be employed as the sole color layer of an article. This features allows for improved manufacturing efficiency is preparing color customized substrates, particularly retroreflective sheeting. Alternatively, a separate color layer(s) comprising a colorant with a polymeric matrix may be disposed between the barrier layer and the substrate. Such color layers are preferably disposed between the bonding layer and the inventive barrier layer.

Rather than providing a bonding layer as a separate layer, the bonding layer can be incorporated into the barrier layer by admixing a bonding layer composition, or major component thereof, with the barrier layer composition. Nonreactive soft components are particularly preferred for this purpose. It is surmised that the non-reactive soft component acts as an adhesive by softening during heat lamination, whereas the cross-linked component (e.g. cross-linked hard component) maintains its integrity.

In the preparation of the articles and article of the invention, coatings or 100% solids barrier layers can be coated directly onto a film via coextrusion or other film-forming techniques, a bonding layer not being required. Alternatively, the barrier layer along with a bonding layer can be pre-coated (solution or 100% solids) onto a liner to improve handling, allowing subsequent storage and lamination to a variety of substrates. For such embodiments, the barrier layer preferably does not adhere to the liner such that stripping of the liner is hindered. Further, the bonding layer preferably does not adhere to the liner backing in such a way to hinder unwinding. Silicone additives, such as commercially available from BYK Chemie USA, Wallingford, Conn., commercially available under the trade designation "BYK 300" or "BYK 370", in amounts around 0.1% can be added to the barrier layer to improve liner stripping without prohibiting ink adhesion. Similarly, such silicone additive can be added to the bonding layer to improve unwinding without prohibiting lamination to a receptive substrate.

In the simplest construction, the article of the invention is a free-standing film comprising the barrier composition of the invention. The inventive barrier layer composition may also be present as a coating disposed directly on a substrate. In the case of transfer coating via heat lamination, a bonding layer is typically disposed between the substrate and the inventive barrier layer composition. In other embodiments, the article may comprise one or more other coating or layers such as color layers, primers, etc. In such embodiments, the barrier layer may not be in direct contact with the substrate, but rather the inventive barrier layer is positioned between the substrate and the surface of the article being protected from staining. Likewise, the bonding layer may not be in direct contact with either the substrate or the barrier layer, yet is disposed in between the substrate and barrier layer. For example, the substrate may have a primer layer with the bonding layer applied to the primer. Alternatively, or in addition to, a color layer may be disposed on the bonding layer, between the bonding layer and the barrier layer or between the bonding layer and the substrate.

The cured coating layer or film comprised of the inventive barrier composition and optional bonding layer is transparent, such that an uncolored coating or film is able to transmit at least 50 percent of visible light incident upon the film. More preferably, the coating layer or film has a light transmissibility of greater than about 70 percent, even more preferably greater than about 80 percent and most preferably greater that about 90 percent at these wavelengths. The transmissibility, or retained brightness, can be measured according to ASTM E-810. Conversely, the haze value of the coating layer or film, as measured according to ASTM D1003 of less than 50%, preferably less than about 30%, more preferably less than about 20%, even more preferably less than about 10%, and most preferably less than about 5%.

The cured composition of the present invention exhibits a synergistic combination of flexibility, printability, and stain resistance, as previously defined. As further indicative of the flexibility, the cured composition of the present invention typically exhibits an elongation of at least 150% in accordance with ASTM D-412, and preferably an elongation of at least 200%.

In some embodiments, the composition of the present invention surprisingly exhibits selective chemical solubility that resists certain plasticizers, dyes, solvent, and staining effects while allowing other solvents to permeate the surface, allowing ink systems to adhere. The Applicant surmises that the solubility is predicative of whether the composition exhibits this synergistic combination of printability and stain resistance. In the case of reactive systems, the selective solubility is surmised attributed to the partial cross-linking of the compositions of the invention. For uncross-linked mixtures, the high molecular weight and insolubility of the hard component is believed to contribute to the selective solubility.

In such embodiments, the composition of the invention is soluble, as previously defined, in at least one of acetone and/or methyl ethyl ketone (MEK) and/or methyl isobutyl ketone (MIBK) and/or cyclohexanone and/or propylene glycol methyl ether (PM), propylene glycol methyl ether acetate (PMA) and/or ethyl acetate, and mixtures thereof. To aid in the versatility of inks that can be subsequently printed on the coated surface, the composition of the invention is preferably soluble in at least two of these solvents, more preferably soluble in at least three, even more preferably soluble in at least four, etc., with being soluble in all seven of these solvents being the most preferred. In other embodiments, however, the composition of the invention is printable even though the composition is not necessarily soluble in these particular solvents.

Although, the composition of the invention is printable, it is also stain resistant. In particular, the composition is insoluble is at least one solvent including ethanol, isopropanol, toluene, xylene, kerosene, gasoline, and mineral spirits. The composition of the invention is preferably insoluble in at least two of these solvents, more preferably insoluble in at least three, even more preferably insoluble in at least four, etc., with being insoluble in all seven of these solvents being the most preferred. Further, the compositions of the invention have demonstrated substantially improved stain resistance to fluorescent yellow colored plasticized PVC (e.g. 0.1% by weight fluorescent yellow dye commercially available from Clariant, Basking Ridge, N.J. under the trade designation "Hostasol Yellow 3G") and improved stain resistance when contacted with red fabric that bleeds during washing.

The coatings of the present invention have found particular utility as barrier layers for PVC and other films that contain unreacted liquid plasticizers. Liquid plasticizers and colorants soluble in the plasticizers tend to migrate over time in order to reach an equilibrium concentration at the interface between the film and a contacting layer or substrate. Internal migration or staining is evident by the presence of oil or stain on the exposed surface. Internal migration or staining can also be detected by the eventual staining of absorbent materials, such as paper, in contact with the exposed surface. Other external staining occurs when plasticized PVC is contacted with other soluble dyes contained in color layers, colored substrates, and fabric dye colorants found in laundered fabrics. In general, both internal and external staining tendencies worsen with increased temperature. The coatings and films of the present invention resist staining at ambient temperature. Preferred coating and films also resist external and internal staining at elevated temperatures, ranging up to about 40° C. and most preferred embodiments at 60° C. The coatings and films of the present invention have been found to resist staining caused from colored (e.g. fluorescent yellow) PVC substrates as well as bleeding fabric dyes at temperatures ranging from ambient temperature 25° C. to 60° C.

Unlike plasticized polyvinyl chloride (PVC) film, the flexible films and coatings of the present invention advantageously exhibit improved surface slip that prevent drag and minimize distortion during the winding and unwinding of roll goods. Improved surface slip also facilitates free movement of sewing machine shoes for sewn-on films and in particular retroreflectors for clothing applications.

The coating and film of the invention is ink receptive to a variety of print methods. More detailed information concerning such methods is available in standard printing textbooks. Although the composition is well-suited for screen printing, other print methods that may also be employed include electrostatic printing, electrophotographic printing (including laser printing and xerography); ion deposition printing, also referred to as electron beam imaging (EBI); magnetographics, ink-jet printing, and thermal mass transfer printing.

The coatings, films and coated articles of the invention are useful in a variety of articles, particularly as a coating on commercial graphic applications including, floor graphics, vehicle advertisements, sign graphics, awning graphics, etc., as well as printed tapes, decals, flags, and banners.

The coatings, films, and coated articles find further utility for retroreflective articles and in particular as a coating on the retroreflective viewing surface of retroreflective sheeting. The two most common types of retroreflective sheeting suitable for use are microsphere-based sheeting and cube corner-based sheeting. Microsphere sheeting, sometimes referred to as "beaded sheeting," is well known to the art and includes a multitude of microspheres typically at least partially embedded in a binder layer, and associated specular or diffuse reflecting materials (such as metallic vapor or sputter coatings, metal flakes, or pigment particles). "Enclosed-lens" based sheeting refers to retroreflective sheeting in which the beads are in spaced relationship to the reflector but in full contact with resin. The "encapsulated lens" retroreflective sheeting is designed such that the reflector is in direct contact with the bead but the opposite side of the bead is in a gas interface. Illustrative examples of microsphere-based sheeting are disclosed in U.S. Pat. No. 4,025,159 (McGrath); U.S. Pat. No. 4,983,436 (Bailey); U.S. Pat. No. 5,064,272 (Bailey); U.S. Pat. No. 5,066,098 (Kult); U.S. Pat. No. 5,069,964 (Tolliver); and U.S. Pat. No. 5,262,225 (Wilson).

Cube corner sheeting, sometimes referred to as prismatic, microprismatic, triple mirror or total internal reflection sheetings, typically include a multitude of cube corner elements to retroreflect incident light. Cube corner retroreflectors typically include a sheet having a generally planar front surface and an array of cube corner elements protruding from the back surface. Cube corner reflecting elements include generally trihedral structures that have three approximately mutually perpendicular lateral faces meeting in a single corner—a cube corner. In use, the retroreflector is arranged with the front surface disposed generally toward the anticipated location of intended observers and the light source. Light incident on the front surface enters the sheet and passes through the body of the sheet to be reflected by each of the three faces of the elements, so as to exit the front surface in a direction substantially toward the light source. In the case of total internal reflection, the air interface must remain free of dirt, water and adhesive and therefore is enclosed by a sealing film. The light rays are typically reflected at the lateral faces due to total internal reflection, or by reflective coatings, as previously described, on the back side of the lateral faces. Preferred polymers for cube corner sheeting include poly(carbonate), poly(methyl methacrylate), poly(ethylene terephthalate), aliphatic polyurethanes, as well as ethylene copolymers and ionomers thereof. Cube corner sheeting may be prepared by casting directly onto a film, such as described in U.S. Pat. No. 5,691,846 (Benson, Jr.) incorporated herein by reference. Preferred polymers for radiation cured cube corners include cross-linked acrylates such as multifunctional acrylates or epoxies and acrylated urethanes blended with mono- and multifunctional monomers. Further, cube corners such as those previously described may be cast on to plasticized polyvinyl chloride film for more flexible cast cube corner sheeting. These polymers are preferred for one or more reasons including thermal stability, environmental stability, clarity, excellent release from the tooling or mold, and capability of receiving a reflective coating.

In embodiments wherein the sheeting is likely to be exposed to moisture, the cube corner retroreflective elements are preferably encapsulated with a seal film. In instances wherein cube corner sheeting is employed as the retroreflective layer, a backing layer may be present for the purpose of opacifying the article or article, improving the scratch and gouge resistance thereof, and/or eliminating the blocking tendencies of the seal film. Illustrative examples of cube corner-based retroreflective sheeting are disclosed in U.S. Pat. No. 5,138,488 (Szczech); U.S. Pat. No. 5,387,458 (Pavelka); U.S. Pat. No. 5,450,235 (Smith); U.S. Pat. No. 5,605,761 (Burns); U.S. Pat. No. 5,614,286 (Bacon Jr.) and U.S. Pat. No. 5,691,846 (Benson, Jr.).

The coefficient of retroreflection of the retroreflective layer varies depending on the desired properties of the finished article. In general, however, the retroreflective layer typically has a coefficient of retroreflection ranging from about 5 candelas per lux per square meter, for colored retroreflective layers, to about 1500 candelas per lux per square meter at 0.2 degree observation angle and −4 degree entrance angle, as measured according to ASTM E-810 test method for coefficient of retroreflection of retroreflective sheeting. For cube corner sheeting the coefficient of retroreflection is preferably at least about 200 candelas per lux per square meter for fluorescent orange and at least about 550 candelas per lux per square meter for white.

In the case of wrap products, tape, decals, license plate sheeting, barricade sheeting, barrel wrap and sign sheeting for example, a pressure sensitive adhesive is typically applied to the opposing surface of the article in order to secure the article or article to a barrel, cone, post, roadway, license plate, barricade, or sign surface. In other applications the article may be adhered to, sewn, or welded (e.g. heat, radio frequency, ultrasonic) onto clothing, shoes, personal flotation devices, etc.

Flexible articles are suitable for use in roll-up signs, flags, banners and other retroreflective articles requiring similar flexibility including other traffic warning items such as rollup sheeting, cone wrap sheeting, post wrap sheeting, barrel wrap sheeting, license plate sheeting, barricade sheeting and sign sheeting; vehicle markings and segmented vehicle markings; pavement marking tapes and sheeting; as well as retroreflective tapes and decals. The article is also useful in a wide variety of retroreflective safety devices including articles of clothing, shoes, construction work zone vests, life jackets, rainwear, logos, patches, promotional items, luggage, briefcases, book bags, backpacks, rafts, canes, umbrellas, animal collars, truck markings, trailer covers and curtains, etc.

EXAMPLES

Table IV, as follows, depicts the trade designation, supplier, and supplier location for ingredients and materials employed in the examples.

TABLE IV

| Generic Description | Trade Designation | Supplier (Location) |
|---|---|---|
| Hard Components | | |
| aliphatic moisture curing polyurethane approximately 2.8% NCO 40% solids in xylene | "MC 75" | SIA Polymers (Seabrook, NH) |
| linear, hydroxy terminated polyester polyurethane | "Morthane CA151HT" | Huntsman Polyurethanes (Ringwood, IL) |
| thermoplastic polyurethane | "Estane 5706" | B F Goodrich (Cleveland, OH) |
| acrylic polyol in solvent 60% solids in propylene glycol methyl ether acetate, toluene | "Paraloid AU608S" | Rohm and Haas Company (Philadelphia, PA) |
| 100% solids acrylic polyol | "Paraloid AU1164" | Rohm and Haas Company (Philadelphia, PA) |
| acrylic polyol in solvent 60% solids is xylene, propylene glycol methyl ether acetate | "G-Cure 867PX60" | Cognis Corporation (Ambler, PA) |
| saturated polyester in solvent 65% solids propylene glycol monomethyl ether acetate, xylene | "Desmophen 651A-65" | Bayer Corporation (Pittsburg, PA) |
| Soft Components | | |
| thermoplastic polyurethanes | "Estane 5715" and "Estane 5778" | B. F. Goodrich (Cleveland, OH) |
| linear, hydroxy terminated polyester polyurethanes | "Morthane CA118" "Morthane CA237" "Morthane CA 328" "Morthane CA 139" | Huntsman Polyurethanes (Ringwood, IL) |
| saturated polyester polyol in solvent 80% solids in n-butyl acetate | "Desmophen 670A-80" | Bayer Corporation (Pittsburgh, PA) |
| saturated polyester polyol in solvent 75% solids in propylene glycol monomethyl ether acetate | "Desmophen R221-75" | Bayer Corporation (Pittsburgh, PA) |
| thermoplastic aliphatic polyurethane in solvent 25% solids in isopropanol, toluene, propylene glycol methyl ether acetate | "Desmolac 4125" | Bayer Corporation (Pittsburgh, PA) |
| thermoplastic aliphatic polyurethane in solvent 40% solids in xylene, isobutanol | "Desmolac 4340" | Bayer Corporation (Pittsburgh, PA) |
| aliphatic polyurethane in solvent 25% solids in isopropanol, toluene | "SU-26-248" | Stahl USA (Peabody, MA) |
| aliphatic polyurethane in solvent 27% solids in propylene glycol monomethyl ether | "QC4820" | SIA Adhesives, Inc. (Seabrook, NH) |
| Cross-linking Agent | | |
| aliphatic polyisocyanate 75% solids in n-butyl acetate, xylene | "Desmodur N 75 BA/X" | Bayer Corporation (Pittsburgh, PA) |
| 100% solids aliphatic polyisocyanate | "Desmodur N 100" | Bayer Corporation (Pittsburgh, PA) |
| Other Ingredients | | |
| polyester modified hydroxy functional polydimethyl-siloxane 25% solids in xylene, naphtha, cyclohexanone, 2-phenoxyethanol | "BYK 370" | BYK Chemie USA (Wallingford, CT) |
| polydimethylsiloxane 25% solids in xylene, isobutanol | "BYK 300" | BYK Chemie USA (Wallingford, CT) |
| ultraviolet absorber | "Tinuvin 928" | Ciba Geigy (Hawthorne, NY) |
| hindered amine light stabilizer | "Tinuvin 292" | Ciba Geigy (Hawthorne, NY) |

TABLE IV-continued

| Generic Description | Trade Designation | Supplier (Location) |
| --- | --- | --- |
| dibutyltindilaurate catalyst | "Dabco T-12" | Air Products and Chemicals, Inc. (Allentown, PA) |
| PVC Films* | | |
| calendered clear PVC film | "KGC 193" | Achilles USA, Inc. (Everett, WA) |
| calendered fluorescent yellow PVC film | "KGT 193" | Achilles USA, Inc. (Everett, WA) |
| Ink | | |
| vinyl acetate-vinyl alcohol-vinyl chloride polymer and pigments in solvent | "Scotchlite Process Color Series 990" | Minnesota Mining and Manufacturing ("3M") (St. Paul, MN) |
| vinyl chloride-vinyl acetate polymer and pigments in solvent | "Scotchcal Screen Printing Ink Series 4400" | 3M (St. Paul, MN) |

*The "KGC 193" PVC film contains 31% by weight diisononyl phthalate (DINP) and dioctyl adipate (DOA) plasticizers at a plasticizer ratio of 5:1. The "KGT 193" has the same plasticizer content and ratio as "KGC 193" and fluorescent yellow dye. Both films have a thickness of 10 mils (254 microns).

Test Methods

Preparation of Laminates

The inventive barrier layer, Examples 1–9 and 11 of Tables VI and VII, and the corresponding bonding layer, Examples 1B–9B and 11B of Tables VI and VII were coated in tandem on untreated 0.00197 in. (50 micron) gauge polyester film, commercially available from Minnesota Mining and Manufacturing Company ("3M") under the trade designation "Scotchpar P0860197". For each laminate, both of the inventive barrier composition and the bonding layer composition were coated at a wet coating thickness of 0.004 in. (102 micron). The barrier composition was dried at 180° F. (82° C.) for 2 minutes followed by drying at 200° F. (93° C.) for 2 minutes, prior to application of the bonding layer. The bonding layer composition was dried at 200° F. (93° C.) for 5 minutes. Example 12 was coated in the same manner without a bonding layer. After conditioning for 7 days at room temperature (25° C.), the bonding layer surface was contacted to "KGC 193" (clear PVC), in the case of Laminate 1, or fluorescent yellow, in the case of Laminate 2, and heat laminated up to 275° F. (121° C.) with 90 pounds per lineal inch pressure (16 kg/cm). The polyester liner was stripped off to expose the barrier side. The liner-free laminate was conditioned for two days at room temperature prior to testing.

1. Stain Resistance Test

Two 2" by 4" pieces (5 cm by 10 cm) of "KGT 193" fluorescent yellow PVC were placed on the barrier layer side of a 4" by 6" piece (10 cm by 15 cm) of Laminate 1. This assembly was designed to measure top down or external stain resistance. In the case of Laminate 2, designed to measure bottom up or internal stain resistance, two 2" by 4" pieces (5 cm by 10 cm) of "KGC 193" clear PVC were placed on the barrier layer of a 4" by 6" piece (10 cm by 15 cm) of Laminate 2.

The samples were tested under two sets of conditions, 75° F. (24° C.) with a pressure of 200 psi (14 bar) for 48 hours and 140° F. (60° C.) without pressure for 48 hours. After conditioning, the portion of the assembly having the clear vinyl was evaluated for staining, caused by the migration of the fluorescent yellow color into the clear vinyl. In each instance, a control sample of uncoated clear PVC in contact with uncoated fluorescent yellow PVC was also tested. Both experimental laminates, as well as the control, were evaluated subjectively by recording the appearance of the clear vinyl after each set of conditions. The laminates and control samples were also evaluated by taping the edges of the clear vinyl portion onto a piece of standard white 20/50 lb. (9/22 kg) copy paper, commercially available from International Paper, Memphis, Tenn. under the trade designation "Copy-Plus" and measuring the change in color with a colormeter commercially available from Hunter Associate Laboratory Inc., Reston, Va. under the trade designation "Hunterlab Labscan II". The operating conditions for the "Hunterlab Labscan II" included a D65 illuminate and a 2 degree observation angle, recording the coordinate for CIE Y, x and y. CIE 1931 Chromaticity Diagram uses Cartesian coordinates to define a color in color space. (CIE=Commission Internationale d'Eclairage, the International Commission on Illumination) According to CIE 1931 Chromaticity Diagram, the x and y coordinates plot the color saturation and the hue. The change in color was determined by calculating the distance between the coordinates of the sample before and after being tested (contacted with the fluorescent yellow PVC and conditioned as previously described).

2. Ink Adhesion

Ink commercially available from 3M under the trade designations "3M Scotchlite Process Color Series 990" (red 990-12 and black 990-5) and "3M Scotchcal Screen Printing Ink Series 4400" (red 4400-12 and black 4400-05) were coated at a thickness of 3 mils (75 microns) onto the surface of Laminate 1 comprising the cured inventive barrier coating. The inks were allowed to dry at room temperature (75° F./25° C.) for at least 48 hours. The ink coated surface was then scored through in a cross hatch pattern with a sharp razor blade, the parallel and perpendicular scores being spaced apart an intervals of about ⅛" (3 mm). A 1" by 6" piece (2.5 cm by 15 cm) of tape commercially available from 3M under the trade designation "3M Filament Tape 898" was repeatedly contacted to the scored ink coated surface, quickly adhering a 1 square inch (2.54 cm$^2$) portion followed by rapid removal at the rate of about one repetition every 5 to 10 seconds. "Pass" refers to less than 50% of the ink being present on the tape such that an ink graphic would be readable. Preferably, however, less than 10% of the ink is present on the tape.

3. Surface Slip

Two pieces of Laminate 1 were overlapped by 4 inches (10 cm), contacting the barrier coated surfaces with each other. A four-pound (1.8 kg) weight was placed on the overlap. The pieces were then pulled apart by end parallel to the overlap. "Pass" refers to the property of being able to slide apart the coated sample with ease and the films remain flat and undistorted.

4. Flexibility

Laminate 1 was creased at 25° C. "Flexible" refers to those compositions that are free of visible cracks.

Some examples were also tested with ISO 4675 at −20° C.; ISO 7854 exhibiting only slight (Type 1) surface cracks (Type A) after 7500 cycles; and ISO 6330 exhibiting no breaks and greater than 50% transmission with 50 wash cycles at 60° C. and dried at 50° C.

Preparation of the Barrier & Bonding Compositions

In general, all the ingredients used in the preparation of the barrier and bonding layer compositions were formed into solvent solutions. Several of the ingredients were provided by the supplier predissolved in solvent, as indicated in Table IV. Other ingredients were first formed into solutions by dissolving the amount of ingredient indicated in column two, with the amount of MEK and toluene indicated in columns 4 and 5, respectively, as indicated in Table V as follows. The amount of solid ingredient corresponds to the percent solids of the solution.

TABLE V

Starting Solutions

| Solution No. | Designation | Wt-% Solids | Wt-% MEK | Wt-% toluene |
|---|---|---|---|---|
| 1 | Morthane CA 237 | 18.0% | 65.6% | 16.4% |
| 2 | Morthane CA 328 | 21.0% | 63.2% | 15.8% |
| 3 | Estane 5715 | 33.0% | 53.6% | 13.4% |
| 4 | Morthane CA 151 | 26.0% | 59.2% | 14.8% |
| 5 | Estane 5706 | 20.0% | 64.0% | 16.0% |
| 6 | Tinuvin 928 | 16.0% | 67.2% | 16.8% |
| 7 | Tinuvin 292 | 16.0% | 67.2% | 16.8% |
| 8 | Morthane CA 118 | 19.0% | 64.8% | 16.2% |
| 9 | Morthane CA 139 | 19.0% | 64.8% | 16.2% |
| 10 | Estane 5778 | 30.0% | 56.0% | 14.0% |

Inventive barrier compositions, Example 1 to Example 12, and corresponding bonding layer compositions, 1B–9B and 11B, were prepared by combining the ingredients of Table IV and the Solutions of Table V as indicated in Table VI as follows. Examples 1–2 and 4 illustrate a blend of thermoplastic polyurethane and hydroxy functional acrylic polymer as the hard component in combination with a thermoplastic polyurethane soft component. Example 3 employs a blend of a hydroxy functional acrylic polymer and a moisture curing polyurethane as the hard component with a thermoplastic polyurethane as the soft component. Example 5 depicts a hydroxy functional acrylic polymer as the sole hard component in combination with a thermoplastic polyurethane soft component. Example 6 employs a polyester polyol as the hard component in combination with a thermoplastic polyurethane soft component. Example 6 also contains two additional soft components, namely a polyester polyol and a thermoplastic polyurethane. Example 7 employs a blend of a thermoplastic polyurethane and polymeric polyol as the soft component in combination with a hydroxy functional acrylic polymer as the hard component. Example 8 also employed a blend of a thermoplastic polyurethane and polymeric polyol as the soft component. In Example 8, however, a blend of a hydroxy functional acrylic polymer with a thermoplastic polyurethane is employed as the hard component. In Example 9, a moisture curing polyurethane is employed as the hard component with a thermoplastic polyurethane as the soft component. Examples 10 and 11 illustrate nonreactive compositions. Both the hard and soft components of Examples 10 and 11 are thermoplastic polyurethanes, lacking the inclusion of an isocyanate cross-linking agent. Example 10 could be employed with any of the bonding layer compositions. Example 12 employs a polyester polyol as the hard component and a blend of non-reactive thermoplastic polyurethanes as the soft component. Example 12 is a thermoplastic barrier layer that was heat laminated to a film (e.g. vinyl) without a bonding layer.

TABLE VI

% Solution

Inventive Barrier Composition

| Ingredient | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 |
|---|---|---|---|---|---|---|---|---|---|---|---|---|
| "Morthane CA 237" (S1) | 74.15 | 74.14 | | | | | | 55.17 | 50.31 | | 77.2 | |
| "Morthane CA328" (S2) | | | | | 84.19 | | | | | | | |
| "Estane 5715" (S3) | | | 77.14 | | 84.51 | 20.58 | | | | 79.51 | 60.00 | |
| "Desmophen 651A-65" | | | | | | 12.54 | 12.41 | 11.32 | | | | 15.00 |
| "Desmophen R221-75" | | | | | | 7.24 | | | | | | |
| "Morthane CA 151" (S4) | 20.36 | 20.36 | | 9.52 | | | | 15.55 | | | 22.8 | |
| "SU-26-248" | | | | | | 41.50 | | | | | | 67.24 |
| "Estane 5706" (S5) | | | | | | | | | | 40.00 | | |
| "MC 75" | | | | 14.34 | | | | | 20.49 | | | |
| "Paraloid AU608S" | 2.86 | 2.86 | | 5.13 | 13.11 | | 14.78 | 6.74 | | | | |
| "G-Cure 867PX60" | | | 6.15 | | | | | | | | | |

TABLE VI-continued

% Solution

| Ingredient | 1 | 2 | 3 | 4 | 5 | 6 | 7 | 8 | 9 | 10 | 11 | 12 |
|---|---|---|---|---|---|---|---|---|---|---|---|---|
| "Desmodur N 75 BA/X" | 1.68 | 1.68 | 2.37 | 1.16 | 2.38 | 14.18 | 14.59 | 13.30 | | | | 20.32 |
| "BYK 370" | 0.13 | 0.13% | | | | | 0.42 | 0.38 | | | | |
| "Tinuvin 928" (S6) | 0.55 | 0.55 | | | | 1.98 | 1.32 | 1.20 | | | | 1.97 |
| "Tinuvin 292" (S7) | 0.28 | 0.28 | | | | 1.98 | 1.32 | 1.20 | | | | 1.97 |
| "Desmolac 4340" | | | | | | | | | | | | 20.08 |

Bonding Layer Composition

| Ingredient | 1B | 2B | 3B | 4B | 5B | 6B | 7B | 8B | 9B | 10B | 11B | 12B |
|---|---|---|---|---|---|---|---|---|---|---|---|---|
| "Morthane CA118" (S8) | 99.92 | | | 100.00 | | | | | | | | |
| "Morthane CA139" (S9) | | 99.92 | | | | | | | | | 100.00 | |
| "Estane 5778" (S10) | | | 99.88 | | 100.00 | | | | 100.00 | | | |
| "Desmolac 4125" | | | | | | | | 100.00 | | | | |
| "Desmolac 4340" | | | | | | 12.42 | | | | | | |
| "SU-26-248" | | | | | | 82.77 | | 100.00 | | | | |
| "Desmodur N 75 BA/X" | | | | | | 2.48 | | | | | | |
| "BYK 370" | 0.08 | 0.08 | 0.12 | | | | | | | | | |
| "Tinuvin 928" (S6) | | | | | | 1.16 | | | | | | |
| "Tinuvin 292" (S7) | | | | | | 1.16 | | | | | | |

(Solution # of Table V)

TABLE VII

% Solids

Inventive Barrier Composition

| Ingredient | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 |
|---|---|---|---|---|---|---|---|---|---|---|---|---|
| "Morthane CA 237" | 61.29 | 61.28 | | | | | 24.71 | 24.71 | | | 70.00 | |
| "Morthane CA328" | | | | 73.36 | | | | | | | | |
| "Estane 5715" | | | 69.44 | | 74.29 | 16.32 | | | 76.20 | 60.00 | | 11.85 |
| "Desmophen 651A-65" | | | | | | 19.59 | 24.71 | 24.71 | | | | |
| "Desmophen R-211-75" | | | | | | 13.05 | | | | | | |
| "Morthane CA 151" | 24.31 | 24.31 | | 10.27 | | | | 11.03 | | 30.00 | | |
| "SU-26-248" | | | | | | 23.94 | | | | | | 53.12 |
| "Estane 5706" | | | | | | | | | | 40.00 | | |
| "MC 75" | | | 15.65 | | | | | | 23.80 | | | |
| "Paraloid AU608S" | 7.88 | 7.87 | | 12.76 | 20.95 | | 22.06 | 11.03 | | | | |
| "G-Cure 867PX60" | | | 10.06 | | | | | | | | | |
| "Desmodur N 75 BA/X" | 5.77 | 5.78 | 4.85 | 3.61 | 4.76 | 25.57 | 27.22 | 27.22 | | | | 16.05 |
| "BYK 370" | 0.15 | 0.15 | | | | | 0.26 | 0.26 | | | | |
| "Tinuvin 928" | 0.40 | 0.41 | | | | .76 | 0.53 | 0.53 | | | | 1.56 |
| "Tinuvin 292" | 0.20 | 0.20 | | | | .76 | 0.53 | 0.53 | | | | 1.56 |
| "Desmolac 4340" | | | | | | | | | | | | 15.87 |

Bonding Layer Composition

| Ingredient | 1B | 2B | 3B | 4B | 5B | 6B | 7B | 8B | 9B | 10B | 11B | 12B |
|---|---|---|---|---|---|---|---|---|---|---|---|---|
| "Morthane CA118" | 99.90 | | | 100.00 | | | | | | | | |

TABLE VII-continued

| | % Solids | | | | | | |
|---|---|---|---|---|---|---|---|
| "Morthane CA139" | 99.90 | | | | | | 100.00 |
| "Estane 5778" | | 99.90 | 100.00 | | | 100.00 | |
| "Desmolac 4125" | | | | 100.00 | | | |
| "Desmolac 4340" | | | | | 18.35 | | |
| "SU-26-248" | | | | | 73.39 | | 100.00 |
| "Desmodur N 75 BA/X" | | | | | 6.88 | | |
| "BYK 370" | 0.10 | 0.10 | 0.10 | | | | |
| "Tinuvin 928" | | | | | 0.75 | | |
| "Tinuvin 292" | | | | | 0.75 | | |

Example 1 was tested according to the Stain Resistance test, as previously described. The improved stain resistance of Example 1 in comparison to control samples, employing uncoated PVC, is depicted in Table VIII, as follows.

TABLE VIII

Stain Resistance

| Test Conditions | Laminate No. | Shift in xy | Stain Appearance On Clear PVC |
|---|---|---|---|
| 75° F., 200 psi, 48 hours | Control | 0.0843 | Yellow |
| 75° F., 200 psi, 48 hours | Laminate 1 | 0.0000 | none detected |
| 140° F., touching, 48 hours | Control | 0.1697 | Yellow |
| 140° F., touching, 48 hours | Laminate 1 | 0.0295 | Very slight yellow tint |
| 140° F., touching, 48 hours | Control | 0.1514 | Yellow |
| 140° F., touching, 48 hours | Laminate 2 | 0.0136 | Very slight yellow tint |

Examples 2–9 and 11 were tested in a similar manner and found to exhibit substantially improved stain resistance based on appearance in comparison to the control samples. Example 10 is surmised to pass the stain resistance test at 75° F. (<0.05 xy shift). Example 12 was tested and found to pass the stain resistance test at 75° F. (<0.05 xy shift).

Ink Adhesion Test Results

Examples 1–6, 11 and 12 were tested according to the previously described Ink Adhesion test. In each instance, no ink was evident on the tape. The Ink Adhesion of Examples 7–8 was also tested, as previously described, with the black "3M Scotchcal Screen Printing Ink Series 4400" and the black "Scotchlite Process Color Series 990". For each of these black inks, less than 10% of the ink was evident on the tape. Example 10 is surmised to pass the ink adhesion test. Comparative Example A and Comparative Example B were tested in the same manner as Examples 7–8. Comparative A is a commercially available article having a plasticized PVC substrate and a polyurethane coating. The coating composition of Comparative Example A is the reaction product of a hydroxy functional acrylic polymer, a polyester polyol, an aliphatic polyisocyanate, and a catalyst. Comparative B is a competitive commercial product that according to Fourier Transformation Infared (FTIR) analysis is an article having a plasticized PVC substrate and a urethane-acrylic coating. Both Comparative A and Comparative B exhibited greater than 10% of the ink on the tape with the black "Scotchlite Process Color Series 990" and greater than 50% of the ink on the tape with the black "3M Scotchcal Screen Printing Ink Series 4400". The unique feature of printability in combination with stain resistance of the compositions of the invention is believed attributed to their selective solubility. The following Table IX illustrates the solubility, as previously defined, of coatings of the invention in comparison to the previously described comparative examples. Examples 1 and 3 employ Laminate 1 and the control is uncoated "KGC-193" clear vinyl. Although Comparative Example A employs a different plasticized PVC substrate and Comparative Example B employs an unknown plasticized PVC vinyl substrate, the difference in substrates is surmised insignificant with regard to the solubility of the coating on the surface. Table IX illustrates that embodied compositions of the present invention are soluble in acetone, MEK, MIBK, cyclohexanone, PMA, ethyl acetate and PM; whereas Comparative Example A and B are insoluble in such solvents. It is surmised that the poor ink adhesion of the comparative examples is attributed to the fact that the compositions are highly cross-linked, as evident by their insolublity in these solvents.

TABLE IX

Solubility of Cured Coating

| | Control | Example 1 | Example 3 | Comp. Ex. A | Comp. Ex. B |
|---|---|---|---|---|---|
| Acetone | Yes | Yes | Yes | No | No |
| MEK | Yes | Yes | Yes | No | No |
| MIBK | Yes | Yes | Yes | No | No |
| Cyclohexanone | Yes | Yes | Yes | No | No |
| THF | Yes | Yes | Yes | Yes | Yes |
| PMA | Yes | Yes | Yes | No | No |
| Ethyl acetate | Yes | Yes | Yes | No | No |
| PM | No | Yes | Yes | No | No |
| Ethanol | No | No | No | No | No |
| Isopropanol | No | No | No | No | No |
| Toluene | Faint | No | No | No | No |
| Xylene | Faint | No | No | No | No |
| Kerosene | No | No | No | No | No |
| Gasoline | No | No | No | No | No |
| Mineral spirits | No | No | No | No | No |

Yes = Soluble
No = Insoluble
Faint - Swell, but no marring

Surface Slip Test Results

All the inventive samples, with the exception of Example 10, were tested according to the previously described Surface Slip and found to pass. In comparison, uncoated PVC films were found to stretch and distort when tested in this manner. Although evaluated in a slightly different manner, Example 10 also exhibited good surface slip.

Flexibility Test Results

All the inventive samples, with the exception of Example 10, were tested according to the previously described Flexibility test and found to pass. Examples 1–3 and 6 were also tested and found to pass ISO 4675 at −20° C.; ISO 7854, exhibiting only slight (Type 1) surface cracks (Type A) after 7500 cycles; and ISO 6330 exhibiting no breaks and greater than 50% transmission with 50 wash cycles at 60° C. and dried at 50° C. Although evaluated in a slightly different manner, Example 10 also exhibited good flexibility.

Free-Standing Film Examples

Example 12 was prepared into a free-standing film by coating the inventive barrier composition onto a polyester liner, curing the composition and then stripping the cured composition from the liner. Examples 1–9 and 11 could be formed into free-standing films in a similar manner. Examples 1–9, and 11 were formed into free-standing films further comprising their corresponding bonding layers, 1B–9B and 11B, as previously described. The cured film compositions had a total thickness of about 10 microns in the absence of a bonding layer and a total thickness of 0.75 mils (19 microns) with the bonding layer, after being stripped off the liner.

The 0.75 mil (19 micron) film from Examples 1–3 and 6–7 were tested according to ASTM D-412. In each instance, the inventive films exhibited an elongation of about 200% and a tensile of about 4000 psi (28 MPa).

The transparency of the inventive films, having both the barrier layer and bonding layer was also tested. Each of Examples 1–6 and 8 were placed on a retroreflector and the retained brightness was measured according to ASTM E-810. Each film was found to exhibit about 90% transmission.

Direct Coating Without Bonding Layer

Examples 6–7 (barrier coating only) were coated directly onto KGC-193 vinyl at a wet coating thickness of 4 mils (100 microns) with the vinyl being supported by the previously described polyester liner. These examples demonstrate that the bonding layer is optional depending on the coating method.

What is claimed is:

1. An article comprising:
   a flexible film substrate and a layer comprising the reaction product of:
      a hard polymeric component having an elongation up to about 150%;
      a soft component having an elongation ranging from about 200% to about 800% after cross-linking;
      and a cross-linking agent; and
   an ink on said layer.

2. The article of claim 1 wherein said layer is flexible.

3. The article of claim 1 wherein said layer is stain resistant.

4. The article of claim 1 wherein said layer exhibits enhanced surface slip.

5. The article of claim 1 wherein the Shore Hardness of the hard component is at least about 40 D.

6. The article of claim 1 wherein the Shore Hardness of the hard component is at least about 70 D.

7. The article of claim 1 wherein the hard component comprises a first polyurethane polymer, an acrylic polymer, polymeric polyol, or mixture thereof and wherein the hard component has functionality.

8. The article of claim 1 wherein the soft component comprises a second polyurethane polymer having functionality, a polymeric polyol, or mixture thereof.

9. The article of claim 1 wherein the hard component is a polyester polyol.

10. The article of claim 1 wherein the soft component is a polyester polyol.

11. The article of claim 1 wherein the hard component and soft component are thermoplastic.

12. An article comprising:
    a flexible film substrate and a layer comprising the reaction product of:
       a hard component having an elongation up to about 150%;
       a soft component having an elongation ranging from about 200% to about 600% after cross-linking;
       and a cross-linking agent;
    wherein said layer is flexible, printable, and stain resistant.

13. The article of claim 12 wherein the hard component and soft component are thermoplastic.

14. The article of claim 1 further comprising at least one binding layer disposed between said printable polymeric layer and the substrate.

15. The article of claim 12 further comprising at least one bonding layer disposed between said ink and the substrate.

16. The article of claim 14 wherein the bonding layer comprises at least one colorant.

17. The article of claim 15 wherein the bonding layer comprises at least one colorant.

18. The article of claim 1 further comprising a color layer.

19. The article of claim 12 further comprising a color layer.

20. An article comprising:
    retroreflective sheeting comprising a layer wherein the layer comprises a reaction product of:
       a hard polymeric component having an elongation up to about 150%;
       a soft component having an elongation ranging from about 200% to about 800% after cross-linking;
       and a cross-linking agent; and
    an ink on said layer.

21. An article comprising:
    retroreflective sheeting comprising a layer wherein the layer comprises the reaction product of:
       a hard component having an elongation up to about 150%;
       a soft component having an elongation ranging from about 200% to about 600% after cross-linking;
       and a cross-linking agent;
    wherein said layer is flexible, printable, and stain resistant.

* * * * *

UNITED STATES PATENT AND TRADEMARK OFFICE
CERTIFICATE OF CORRECTION

PATENT NO. : 6,660,390 B2
DATED : December 9, 2003
INVENTOR(S) : Bacon, Chester A. Jr.

It is certified that error appears in the above-identified patent and that said Letters Patent is hereby corrected as shown below:

Column 26,
Line 28, "binding" preceding "layer" should be -- bonding --.

Signed and Sealed this

Twenty-seventh Day of July, 2004

JON W. DUDAS
*Acting Director of the United States Patent and Trademark Office*